(12) United States Patent
Care et al.

(10) Patent No.: US 10,465,707 B2
(45) Date of Patent: Nov. 5, 2019

(54) PANEL FOR LINING A GAS TURBINE ENGINE FAN CASING

(71) Applicant: ROLLS-ROYCE plc, London (GB)

(72) Inventors: Ian C D Care, Derby (GB); Stephen O Osiyemi, Derby (GB)

(73) Assignee: ROLLS-ROYCE PLC, London (GB)

( * ) Notice: Subject to any disclaimer, the term of this patent is extended or adjusted under 35 U.S.C. 154(b) by 638 days.

(21) Appl. No.: 15/210,557

(22) Filed: Jul. 14, 2016

(65) Prior Publication Data
US 2017/0045059 A1   Feb. 16, 2017

(30) Foreign Application Priority Data
Aug. 13, 2015   (GB) .................................. 1514363.9

(51) Int. Cl.
*F04D 29/52* (2006.01)
*F04D 29/66* (2006.01)
(Continued)

(52) U.S. Cl.
CPC .......... *F04D 29/526* (2013.01); *F01D 11/127* (2013.01); *F01D 25/24* (2013.01);
(Continued)

(58) Field of Classification Search
CPC .... F01D 11/127; F01D 11/122; F01D 11/125; F01D 25/246; F04D 29/164;
(Continued)

(56) References Cited

U.S. PATENT DOCUMENTS 3,095,943 A * 7/1963 Kemp ..................... E04B 9/001
181/292
3,519,523 A * 7/1970 Rodman ............ B29D 99/0021
428/117
(Continued)

FOREIGN PATENT DOCUMENTS

EP   1 229 213 A1   8/2002
EP   1 589 195 A1   10/2005
EP   2 159 460 A1   3/2010

OTHER PUBLICATIONS

Dec. 28, 2016 Search Report issued in British Patent Application No. GB1612232.7.
(Continued)

*Primary Examiner* — Carlos A Rivera
*Assistant Examiner* — Wayne A Lambert
(74) *Attorney, Agent, or Firm* — Oliff PLLC

(57) ABSTRACT

A panel for lining a gas turbine engine fan casing includes a honeycomb core sandwiched between a backing skin and an outer skin. The backing skin is attached to an inner surface of the casing such that the outer skin forms a radially inward facing surface of a fan duct of the engine. The panel is joined along its sides to similar neighbouring panels such that, in use, the joined panels form a row of panels along the inner surface of the casing. The outer skin or the backing skin includes two face sheets bonded on top of each other, which are arranged such that their edges along each panel side that joins to a neighbouring panel are staggered in the direction of the row. The interfaces between the abutting face sheet edges are therefore correspondingly staggered in the direction of the row.

8 Claims, 4 Drawing Sheets

(51) Int. Cl.
| | | |
|---|---|---|
| *F01D 11/12* | (2006.01) | |
| *F04D 29/02* | (2006.01) | |
| *F04D 29/08* | (2006.01) | |
| *F01D 25/24* | (2006.01) | |
| *F02C 7/045* | (2006.01) | |

(52) U.S. Cl.
CPC ............ *F02C 7/045* (2013.01); *F04D 29/023* (2013.01); *F04D 29/083* (2013.01); *F04D 29/663* (2013.01); *F05B 2220/302* (2013.01); *F05B 2240/40* (2013.01); *F05B 2250/283* (2013.01); *F05B 2260/96* (2013.01); *F05B 2280/5011* (2013.01); *F05D 2230/51* (2013.01); *F05D 2250/283* (2013.01); *F05D 2260/964* (2013.01)

(58) Field of Classification Search
CPC .... F04D 29/526; F04D 29/083; F04D 29/023; F04D 29/663; F05D 2230/23; F05D 2230/51; F05D 2240/11; F05D 2260/96; F05B 2220/302; F05B 2280/5011; F05B 2260/96; F05B 2250/283; F05B 2240/40
USPC .................................................. 415/9, 173.4
See application file for complete search history.

(56) References Cited

U.S. PATENT DOCUMENTS

| | | | | |
|---|---|---|---|---|
| 4,161,231 | A * | 7/1979 | Wilkinson | E04B 1/86 138/149 |
| 6,692,227 | B2 * | 2/2004 | Tomita | F01D 5/225 415/173.7 |
| 6,755,280 | B2 * | 6/2004 | Porte | F02C 7/045 181/290 |
| 6,761,245 | B2 * | 7/2004 | Porte | F02C 7/045 181/210 |
| 6,769,864 | B2 * | 8/2004 | Sathianathan | F01D 21/045 415/200 |
| 6,772,857 | B2 * | 8/2004 | Porte | F02C 7/045 181/210 |
| 6,820,337 | B2 * | 11/2004 | Buge | B64D 33/02 29/897 |
| 6,896,099 | B2 * | 5/2005 | Porte | B64D 33/02 181/210 |
| 7,402,022 | B2 * | 7/2008 | Harper | F01D 21/045 415/214.1 |
| 7,484,592 | B2 * | 2/2009 | Porte | G10K 11/168 181/290 |
| 8,365,405 | B2 * | 2/2013 | Minor | B23P 6/005 29/402.02 |
| 2005/0081992 | A1 | 4/2005 | Buge et al. | |
| 2005/0089391 | A1 * | 4/2005 | Stretton | F01D 21/045 415/9 |
| 2009/0067994 | A1 * | 3/2009 | Pietraszkiewicz | F01D 11/08 415/173.1 |
| 2014/0263579 | A1 * | 9/2014 | Kulkarni | F01D 11/122 228/119 |
| 2014/0367920 | A1 * | 12/2014 | Konigs | B29D 99/0053 277/345 |
| 2015/0184526 | A1 * | 7/2015 | Dudon | B29C 70/58 416/224 |
| 2016/0245102 | A1 * | 8/2016 | Freeman | F01D 11/005 |

OTHER PUBLICATIONS

Dec. 18, 2015 Search Report issued in British Patent Application No. 1514363.9.

* cited by examiner

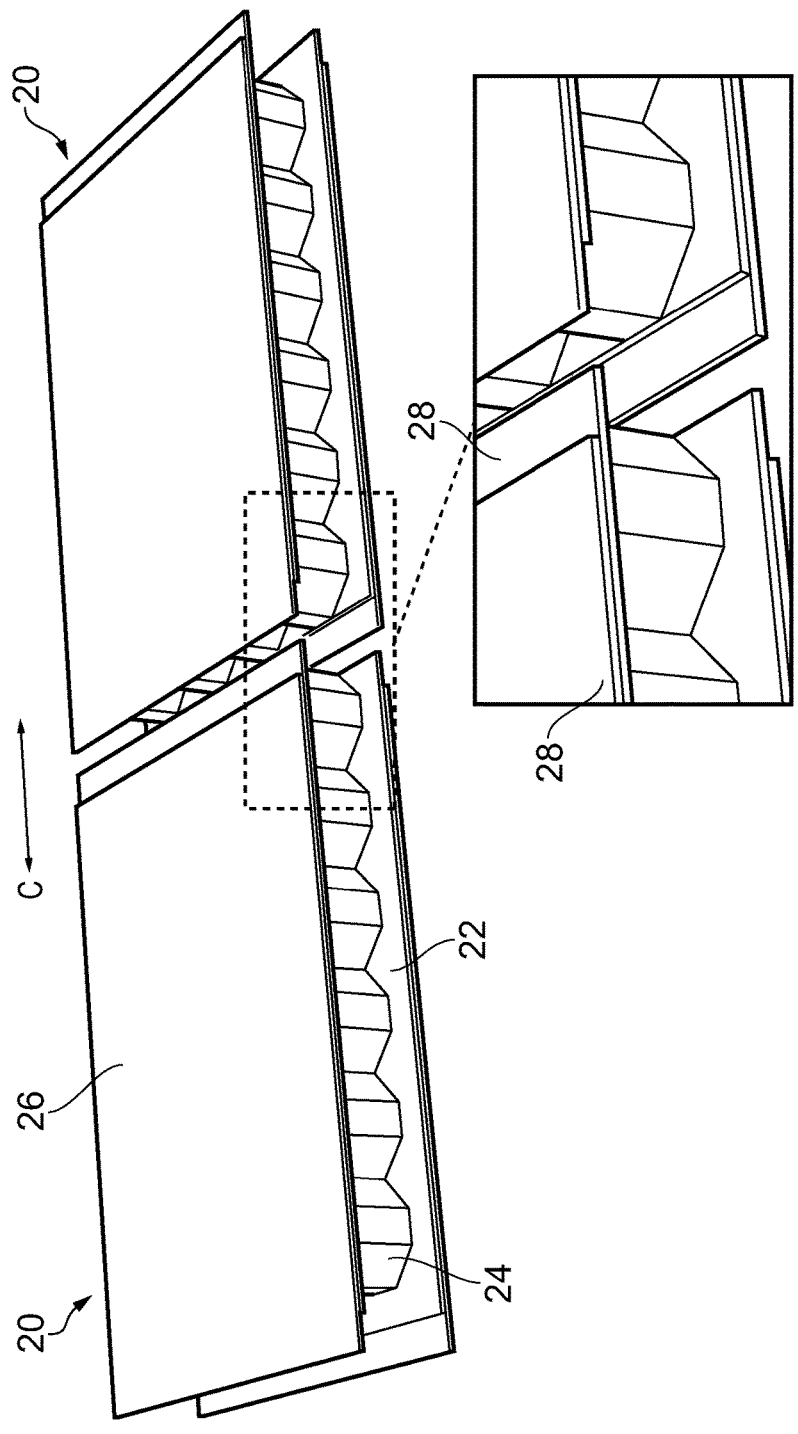
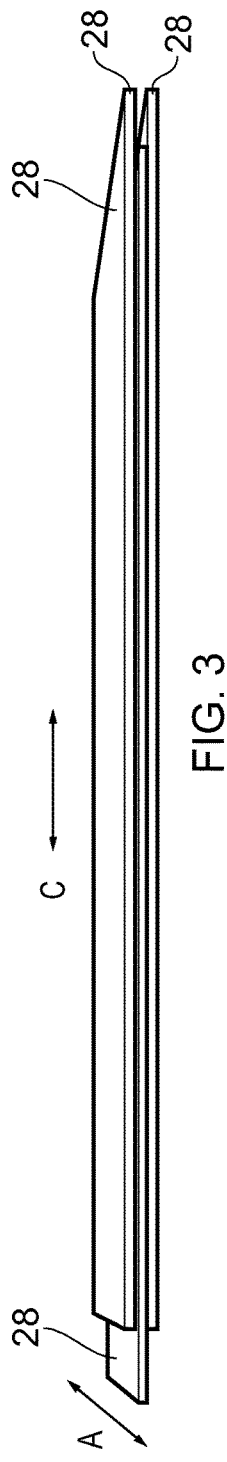
FIG. 2
FIG. 3

PANEL FOR LINING A GAS TURBINE ENGINE FAN CASING

FIELD OF THE INVENTION

The present invention relates to a panel for lining a gas turbine engine fan casing.

BACKGROUND

Acoustic liners and abradable liners are employed in front and rear fan casings of gas turbine engines. Acoustic liners are typically fabricated using a sandwich construction of a GRP (Glass Reinforced Plastic) or aluminium perforate outer skin, an aluminium honeycomb core, and a GRP backing skin for attachment to an inner surface of the casing. Abradable liners can have a similar construction, but typically have an abradable layer to form a track for the tips of the engine fan blades, and may have a non-metallic honeycomb core such as Nomex™ from DuPont.

Each liner may be formed in panel segments, the panels of a row of being butted together to form a complete ring around the inner surface of the fan casing. The panels may have compression moulded front and rear rails to provide structural integrity.

The panels can be attached to the fan casing using adhesive, for example using "vacuum bagging" to conform the panels to curvature of the casing while the adhesive cures, and to avoid entrapment of voids and volatile gases in the adhesive region. Another option is to bolt the panels to the casing.

A problem can arise, however, in that water may leak into the panels and degrade particularly the bonds formed between the outer skin and the honeycomb core.

SUMMARY

It would be desirable to provide a panel which has reduced susceptibility to this form of degradation. It is also desirable, in the context of acoustic liners, that any perforate outer skin or other acoustic treatment is, as far as practical, continuous around a circumference of the liners.

Accordingly, in a first aspect, the present invention provides a panel for lining a gas turbine engine fan casing, the panel including a honeycomb core sandwiched between a backing skin and an outer skin,
  the backing skin being adapted to be attached to an inner surface of the casing such that the outer skin forms a radially inward facing surface of a fan duct of the engine, and the panel further being adapted to be joined along sides thereof to similar neighbouring panels such that, in use, the joined panels form a row of panels along the inner surface of the casing;
  the outer skin or the backing skin including two face sheets bonded on top of each other, the face sheets being arranged such that the edges of the two face sheets along each panel side that joins to a neighbouring panel are staggered in the direction of the row, whereby, when the edges of the two face sheets are butted against edges of matching face sheets of a neighbouring panel, the interfaces between the abutting face sheet edges are correspondingly staggered in the direction of the row.

By staggering the face sheet edges in this way, water ingress at the joint between two panels can thus be resisted, which can help to prevent degradation of bonds formed between the skins and the honeycomb core. Moreover, the staggered edges and interfaces can be compatible, in the context of an acoustic panel, with continuity of an acoustic treatment along the row.

In a second aspect, the present invention provides a row of panels for lining the inner surface of a gas turbine engine fan casing, each panel being a panel according to the first aspect.

In a third aspect, the present invention provides a gas turbine engine fan casing having one or more rows of panels according to the second aspect lining the inner surface of the casing.

Optional features of the invention will now be set out. These are applicable singly or in any combination with any aspect of the invention.

The outer skin or the backing skin may include more than two face sheets. For example, the outer skin or the backing skin may include three face sheets bonded on top of each other, the face sheets being arranged such that the edges of the top and middle face sheets along each panel side that joins to a neighbouring panel are staggered in the direction of the row, and such that the edges of the middle and bottom face sheets along each panel side that joins to a neighbouring panel are staggered in the direction of the row, whereby when the edges of the three face sheets are butted against edges of matching face sheets of a neighbouring panel, the interfaces between the abutting face sheet edges are correspondingly staggered in the direction of the row. By increasing the number of staggered face sheet edges, the resistance to water ingress at the joint between two panels can be increased.

The face sheets may have the same length in the direction of the row, the staggering of the edges along each panel side that joins to a neighbouring panel being achieved by offsetting the face sheets from each other in the direction of the row. Conveniently, all the panels of a row can then be made identical to each other, such that they are modular and interchangeable.

Although particularly beneficial at the outer skin, both the outer skin and the backing skin may include the face sheets with staggered edges.

Typically, the joined panels form a circumferentially extending row of panels along the inner surface of the casing, the direction of the row being the circumferential direction. However, panels may be joined in a row in the axial direction of the casing. Indeed, panels may be joined in rows in more than one direction, e.g. circumferential and axial directions, providing a 2D array of joined panels. Thus the panel may have staggered face sheets edges at more than one pair of opposing sides of the panel. At end of panel rows, or at other panel sides which are not joined to other panels, the staggered face sheets edges may be used to mount e.g. end sealing components to block off free sides of panels, or bridging skins to bridge the skins of spaced panels. Where such bridging skins are deployed to bridge outer skins, they may include acoustic features of the outer skins. For example, if the outer skins are perforated, the bridging skins may be similarly perforated.

The panel may be substantially rectangular or square in shape (and typically slightly curved out of plane to conform to the curvature of the casing), the staggered edges of the face sheets being at opposing sides of the panel. However, staggered face sheets edges may be formed at all sides of the panel. Thus first staggered edges of the face sheets may be at first opposing sides of the panel, and second staggered edges of the face sheets may be at the other, second opposing sides of the panel, whereby the panel is adapted to be joined along the first opposing sides thereof to similar neighbouring panels to form a first row of panels, and the panel is adapted to be joined along the second opposing sides thereof to similar neighbouring panels to form an orthogonal, second row of panels.

The panel may be an acoustic panel (e.g. with a perforated outer skin), or an abradable panel (e.g. with an abradable outer layer).

BRIEF DESCRIPTION OF THE DRAWINGS

Embodiments of the invention will now be described by way of example with reference to the accompanying drawings in which:

FIG. 2 shows two neighbouring panels of a casing liner, just before the panels are joined together along sides thereof, and also a close-up view of the joining region of the panels;

FIG. 3 shows a variant form of bonded face sheets for a backing skin or outer skin of a panel;

FIG. 4A in the outer skins of two neighbouring panels, just before the panels are joined together along sides thereof, and FIG. 4B in the two panels after being joined;

DETAILED DESCRIPTION AND FURTHER OPTIONAL FEATURES

Figure 1:
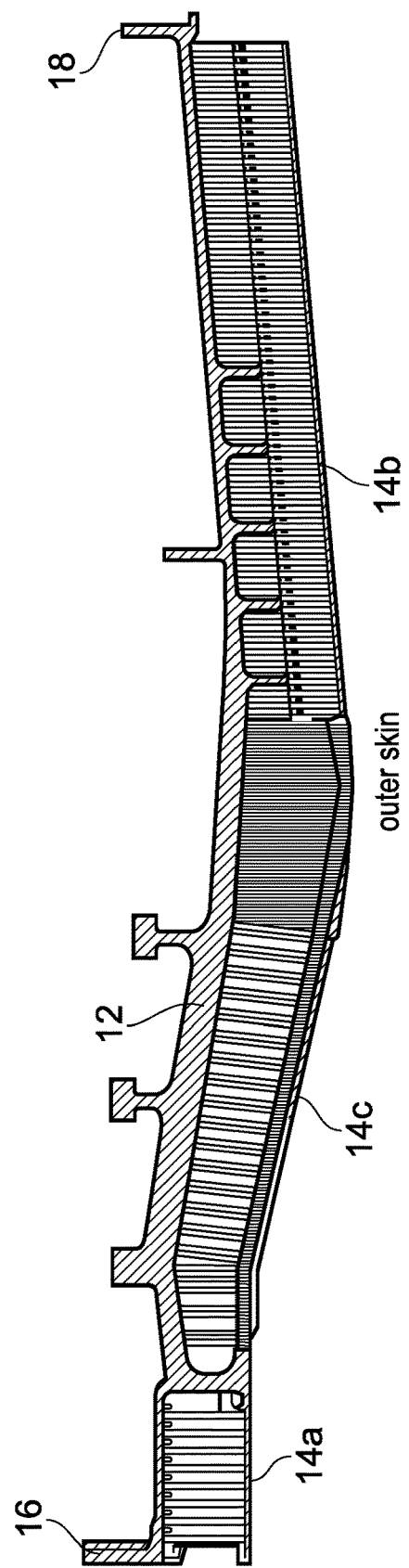
FIG. 1 shows a partial section through a fan casing assembly of a gas turbine engine.

FIG. 1 shows a partial section through a fan casing assembly of a gas turbine engine. The annular fan casing 12 is generally cylindrical or frustoconical in shape. It has a forward flange 16 and a rearward flange 18 attached to further structure of the gas turbine engine, which is not shown. These flanges 16 and 18, and the annulus of the fan casing 12 between them, provide a load path through which mechanical loads may be transmitted during the operation of the gas turbine engine. Within the annular fan casing 12 are secured a front acoustic liner 14a, a rear acoustic liner 14b and a fan track abradable liner 14c. The liners are formed as a circumferentially extending row of respective panel segments, the panels of a given row of being joined together to form a complete ring around the inner surface of the fan casing 12. The panels can be attached to the fan casing 12 using adhesive or bolts.

FIG. 2 shows two neighbouring panels 20 of one of the liners 14a-c, just before the panels are joined together along sides thereof, and also a close-up view of the joining region of the panels. Each panel is substantially rectangular in shape, and has a backing skin 22 which attaches to the casing, an aluminium honeycomb core 24, and an outer skin 26 which forms the radially inward facing surface of the fan duct of the engine. The skins are adhesively bonded to the core. Each of the backing skin and the outer skin is formed in turn from a pair of face sheets 28 bonded on top of each other.

All the face sheets 28 have the same length in the circumferential direction C. However, the two face sheets of each skin are offset from each in the circumferential direction. As a result, the edges of the two face sheets along each panel side that joins to the neighbouring panel side are staggered in the circumferential direction. As a result, when the edges of these two face sheets are butted against the edges of the matching face sheets of the neighbouring panel, the interfaces between the abutting face sheet edges are correspondingly staggered in the circumferential direction. The joints between the backing skins 22 of the neighbouring panels 20 and between the outer skins 26 of the neighbouring panels thus resemble single lap joints. The overlapping sheets and staggered interfaces of these joints resist water ingress, and thus help to prevent degradation of the adhesive which bonds the skins to the core 24.

Conveniently, by offsetting face sheets 28 of the same length to form the staggered face sheet edges, all the panels of a row can be made identical to each other, such that they are modular and interchangeable.

Figure 4:
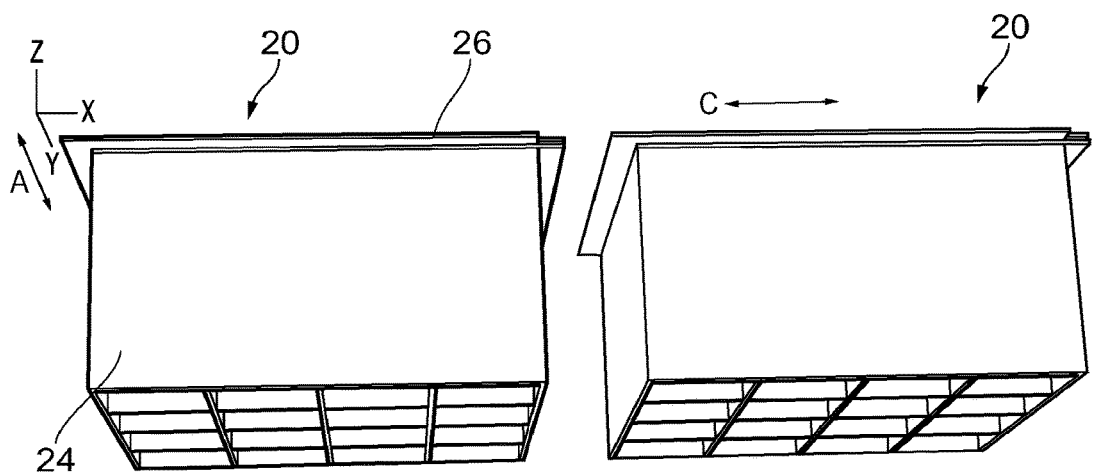
FIGS. 4A and 4B show the variant of FIG. 3.
Figure 4:
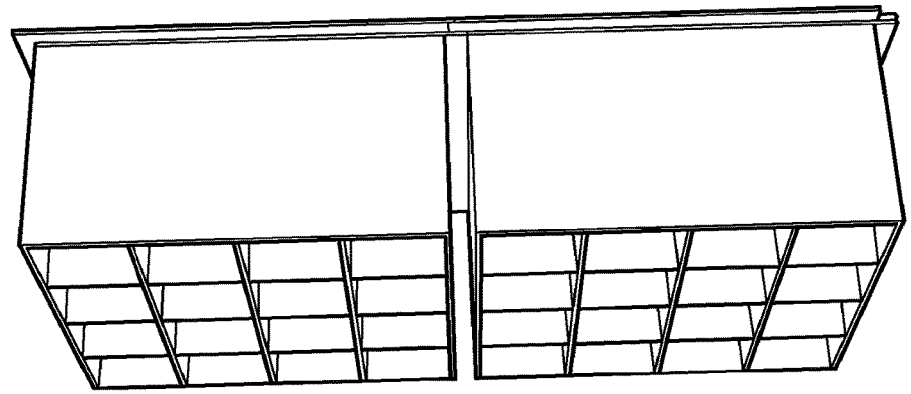

FIG. 3 shows a variant form of the bonded face sheets 28 for the backing skin 22 or the outer skin 26. In the variant, rather than having just two circumferentially offset face sheets, the skin has three face sheets, with the middle sheet being circumferentially offset from the top and bottom sheets. FIG. 4A shows this variant in the outer skins 26 of two neighbouring panels 20, just before the panels are joined together along sides thereof, and in FIG. 4B the two panels after being joined. In FIGS. 4A and 4B the backing skins of the panels are not shown. The joints between the outer skins of the neighbouring panels now resemble double lap joints. The extra face sheets further enhance the ability of the outer skins to resist water leakage.

Figure 5A:
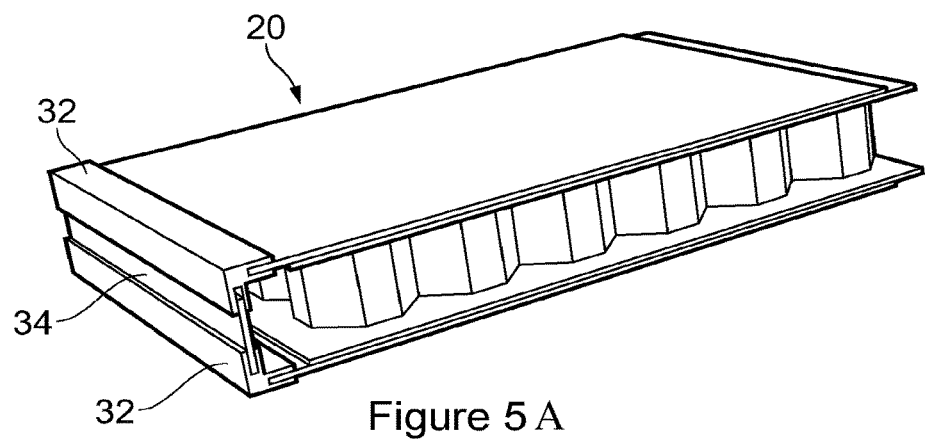
FIGS. 5A and 5B show end sealing components used in conjunction with FIG. 5A a panel having two face sheets for each skin, and FIG. 5B a panel having three face sheets for each skin.
Figure 5B:
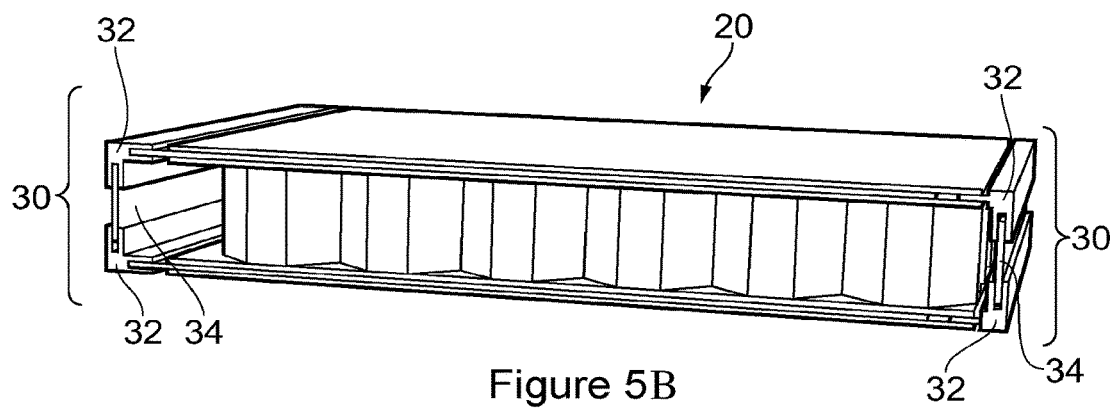
Figure 6:
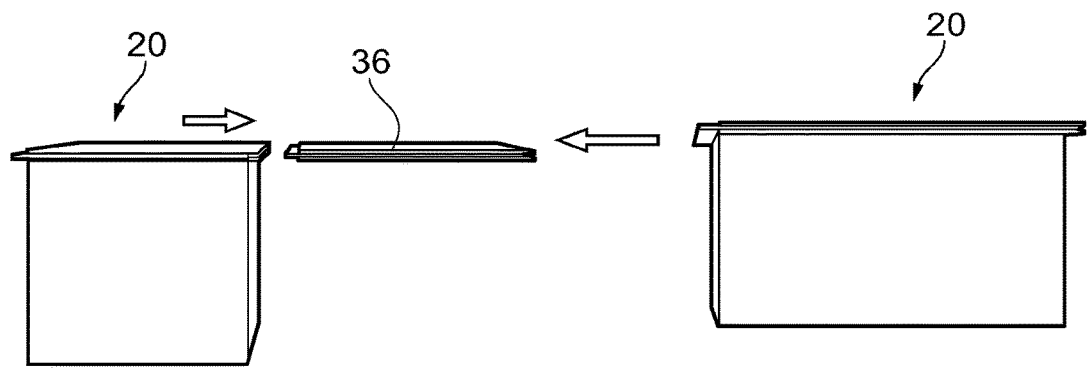
FIG. 6 shows a bridging skin inserted between outer skins of opposing free sides of two panels.

As well as being circumferentially offset from the top and bottom face sheets, the middle face sheet can be offset from the top and bottom sheets in the axial direction A of the casing (as shown in FIGS. 3, 4A and 4B). Rows of joined panels 20 can thus also be formed in the axial direction, with neighbouring panels in each axial row similarly benefiting from outer skins 26 and/or backing 22 skins formed from face sheets in which the interfaces between abutting face sheet edges are staggered in the direction of the row.

Where a panel 20 has a free side which is not joined to another panel, it is possible to use the staggered edges of the face sheets of that side as mounting features for end sealing components, and closing off e.g. acoustic cavities. This is shown in FIGS. 5A and 5B for FIG. 5A a panel having two face sheets for each skin, and FIG. 5B a panel having three face sheets for each skin. Each end sealing component 30 has a pair of spaced angled portions 32 which extend along and are shaped to mate with the staggered edges of the face sheets, and a wall portion 34 which blocks off the free side of the panel and fits in grooves formed in the angled portions 32. The width of the wall portions can be varied depending on the thickness of the panel.

Where a pair of spaced panels 20 have opposing free sides, another option is to insert a bridging skin between the skins of the two panels. As shown in FIG. 6, the bridging skin 36 can have the same number and arrangement of face sheets as the corresponding skins of the spaced panels so that staggered interfaces can be formed between abutting face sheet edges of the bridging skin and the skins of the panels. The bridging skin also helps to seal off free sides of the panels. Where the bridging skin is used to link outer skins 26 having acoustic features (e.g. perforations), it may include similar acoustic features.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the scope of the invention.

The invention claimed is:

1. A circumferentially-extending row of panels for lining a gas turbine engine fan casing, each of the panels including a honeycomb core sandwiched between a backing skin and an outer skin, the backing skin being adapted to be attached to an inner surface of the casing such that the outer skin forms a radially inward facing surface of a fan duct of the engine, and each of the panels having two opposing sides adapted to be joined along the two opposing sides to neighbouring ones of the panels such that the joined panels form the circumferentially-extending row of panels along the inner surface of the casing, and the outer skin or the backing skin including two face sheets bonded on top of each other, the face sheets being arranged such that the edges of the two face sheets along each of the two opposing sides of the panel that join to the neighbouring ones of the panels are staggered in the direction of the row, whereby, when the edges of the two face sheets are butted against edges of matching face sheets of one of the neighbouring ones of the panels, the interfaces between the abutting face sheet edges are correspondingly staggered in the direction of the row.

2. The circumferentially-extending row of panels according to claim 1, the outer skin or the backing skin includes three face sheets bonded on top of each other, the face sheets being arranged such that the edges of the top and middle face sheets along each of the panel sides that joins to one of the neighbouring ones of the panels are staggered in the direction of the row, and such that the edges of the middle and bottom face sheets along each of the panel sides that joins to one of the neighbouring one of the panels are staggered in the direction of the row, whereby when the edges of the three face sheets are butted against edges of matching face sheets of said one of the neighbouring ones of the panels, the interfaces between the abutting face sheet edges being correspondingly staggered in the direction of the row.

3. The circumferentially-extending row of panels according to claim 1, wherein the face sheets have the same length in the direction of the row, the staggering of the edges along each of the panel sides that joins to one of the neighbouring ones of the panels being achieved by offsetting the face sheets from each other in the direction of the row.

4. The circumferentially-extending row of panels according to claim 1, wherein the outer skin and the backing skin each include said face sheets.

5. The circumferentially-extending row of panels according to claim 1, wherein each of the panels is substantially rectangular or square in shape.

6. The circumferentially-extending row of panels according to claim 5, wherein second staggered edges of the face sheets are at the other, second opposing sides of the panel, whereby each of the panels is adapted to be joined along at least one of the second opposing sides to neighbouring panels to form an orthogonal, second circumferentially-extending row of panels.

7. The circumferentially-extending row of panels according to claim 1, which each of the panels is an acoustic panel or an abradable panel.

8. A gas turbine engine fan casing having one or more of the circumferentially-extending rows of panels according to claim 1 lining the inner surface of the casing.

* * * * *